United States Patent [19]

Hakansson et al.

[11] 4,349,958
[45] Sep. 21, 1982

[54] DEVICE FOR TEMPERATURE MEASUREMENT AND A METHOD FOR THE MANUFACTURE OF SUCH A DEVICE

[75] Inventors: Hakan B. Hakansson; Lennart P. E. Persson, both of Lund; Berth-Ove G. Wall, Bjärred, all of Sweden

[73] Assignee: Gambro AB, Lund, Sweden

[21] Appl. No.: 251,468

[22] Filed: Apr. 6, 1981

Related U.S. Application Data

[62] Division of Ser. No. 131,079, filed Jul. 3, 1978 as PCT/SE78/00012, published Feb. 7, 1980 as WO80/00191, 102(e) date Jun. 1, 1979, U.S. Pat. 4,296,633.

[51] Int. Cl.³ .................................................. H01C 7/02
[52] U.S. Cl. ........................................ 29/612; 338/25; 374/185
[58] Field of Search ............ 29/611, 612; 73/362 AR; 338/25, 26, 28, 30, 254

[56] References Cited

U.S. PATENT DOCUMENTS

| 3,188,594 | 6/1965 | Koller et al. ............. 73/362 AR X |
| 3,646,494 | 2/1972 | Waseleski et al. .................... 338/25 |
| 3,833,145 | 9/1974 | Crosly ........................ 73/362 AR X |
| 3,872,419 | 3/1975 | Groves ................................. 338/21 |
| 4,200,970 | 5/1980 | Schonberger . |
| 4,253,334 | 3/1981 | Hakansson . |
| 4,316,367 | 3/1902 | Schonberger . |

FOREIGN PATENT DOCUMENTS 2448455 12/1975 Fed. Rep. of Germany .
522660 6/1940 United Kingdom .

*Primary Examiner*—Leon Gilden
*Attorney, Agent, or Firm*—Lerner, David, Littenberg & Samuel

[57] ABSTRACT

The invention relates to a device for temperature measurements, comprising a temperature-sensitive sensor whose electrical properties, e.g. resistance, vary with the temperature, e.g. a thermistor, and which via two contacts is connected to two electric conductors arranged on a support, which electric conductors in turn can be connected to a reading unit for the reading of the actual values of current, voltage or the like corresponding to the temperature.

In a preferred embodiment the said electric conductors are in the form of two metal layers on both sides of a support made of plastics. The one metal layer is interrupted by a gap which is arranged to be bridged by the sensor, one contact of which is connected to each conductor.

11 Claims, 3 Drawing Figures

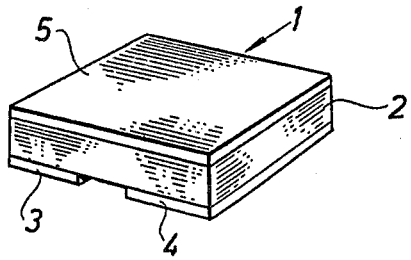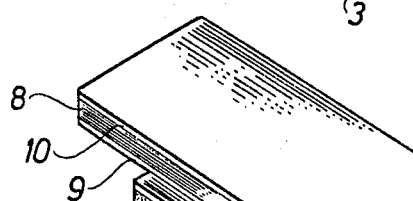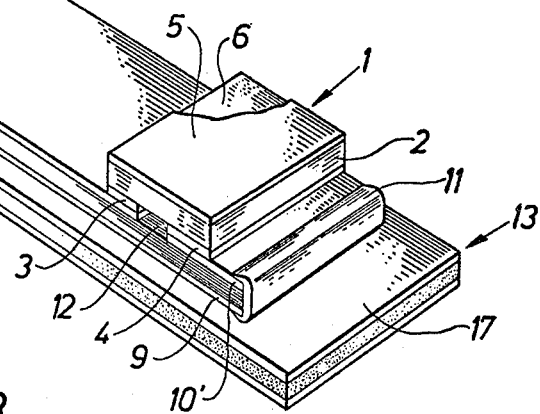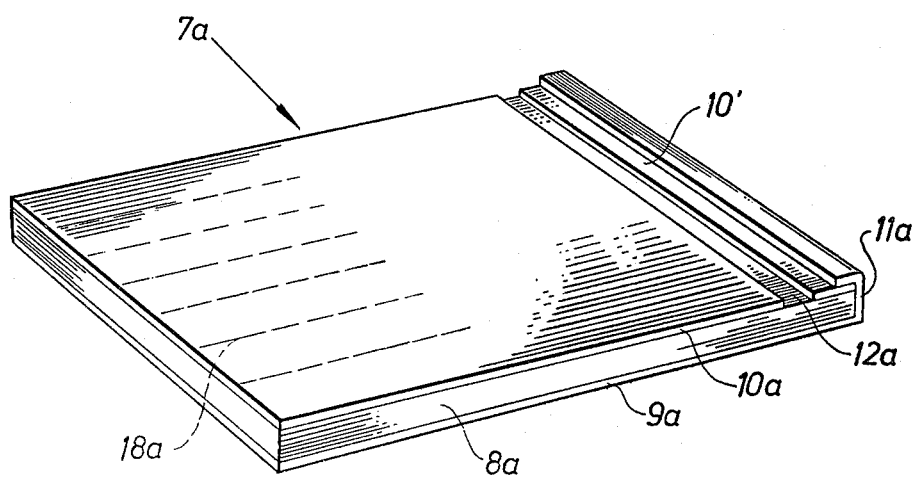

DEVICE FOR TEMPERATURE MEASUREMENT AND A METHOD FOR THE MANUFACTURE OF SUCH A DEVICE

This is a division of application Ser. No. 131,079, filed 6/1/79, now U.S. Pat. No. 4,296,633 and as described and claimed in International Application PCT/SE78/00012 filed 7/3/78, and as amended on 1/12/79.

TECHNICAL FIELD

The present invention relates to a method of manufacturing a device for temperature measurement, which device includes a temperature-sensitive sensor, whose electrical properties, e.g. the resistance, vary with the temperature, e.g. a thermistor, and which is connected via two contacts to two electric conductors arranged on a support, which electric conductors in turn can be connected to a reading unit for the reading of the actual values of current, voltage or the like corresponding to the temperature.

The device in accordance with the invention is mainly intended for use in medical temperature measurement. It is desirable therefore to make it simple and cheap so that it can be discarded after application, that is to say, so that it does not have to be re-used.

To those versed in the art it will be clear, however, that the device in accordance with the invention can also be used in different circumstances, e.g. in purely industrial applications, where a simple and inexpensive yet reliable reading of the temperature is required.

BACKGROUND ART

The Swedish patent application WO/78.03046-7 (U.S. patent application Ser. No. 779 152, filed Mar. 18, 1977 and now U.S. Pat. No. 4,135,178 which is the parent of U.S. patent application Ser. No. 41,551, filed May 23, 1979, now U.S. Pat. No. 4,317,367) contains a description of different embodiments of a device similar to that according to the invention and how the device according to the invention can be applied. The idea behind the present invention is to produce such a device, but which is of a simpler type and which can be made by a simpler method of manufacture.

In U.S. patent applications Ser. No. 787,422 filed Apr. 14, 1977, now U.S. Pat. No. 4,200,970, and Ser. No. 879,193, filed Feb. 21, 1978) different trimming procedures for devices similar to that according to the invention are described. It should be possible to apply similar trimming procedures for the trimming of the device in accordance with the invention.

DISCLOSURE OF INVENTION

The device in accordance with the invention is characterized in that the two electric conductors are arranged on both sides of the support which is in the form of an elongated strip and that the one conductor extends directly or via a suitable extension over one edge of the support in the direction towards the other conductor, but without reaching as far as the same, thus forming a gap, slit or the like which is arranged so that it is bridged by the sensor, one contact of which is connected to each conductor.

The abovementioned construction makes possible a very simple method of manufacture which also constitutes an object of the present invention. This method is characterized in that a sheet of an electrically insulating material, e.g. plastics, which is coated with metal on both sides is electrically short-circuited along one edge, that a gap, slit or the like is provided parallel with this edge, that the sheet is cut into strips transversely to the short-circuiting and to the said gap, slit or the like and that a sensor is made to bridge this gap, slit or the like with one contact connected to each metal coating.

The abovementioned support can thus be constituted of a thin strip of plastics or similar electrically insulating material, the said conductors being arranged as thin metal coatings on opposite plane surfaces of the strip and the said gap can thus be provided transversely to the longitudinal direction of the strip in the form of a cut in the one metal coating near one end of the strip.

The short circuiting of the sheet provided metal coatings on either side used as a starting material can be achieved in various ways. It is brought about preferably in that a soldering material or some other similar electrically conducting material is made to surround the edge in contact with both the metal coatings. Alternatively, the one metal coating can be allowed to extend beyond the plastic material in the support and this coating can then be folded around the edge to make contact on the other side.

The sensor used should be provided on one side with two contacts for connection to each conductor. On the opposite side the sensor is appropriately provided with a third contact especially intended for trimming. This trimming may be carried by means of shot peening, laser or some other mechanical or chemical treatment.

The abovementioned gap, slit or the like is appropriately produced by planing, scraping or some other kind of machining.

After the individual devices have been separated by cutting the starting material used into strips transversely to the short-circuiting and to the said gap, slit or the like, the striplike supports obtained can in turn be placed onto somewhat broader strips of a semi-rigid material, e.g. cardboard. The sensor and the connecting contacts are then placed appropriately so that they are located fully within the surface of the broader strip which carries the support. The end of the support remote from the sensor, on the other hand, is appropriately made to project beyond the end of the broader strip so as to facilitate the external connection to the contacts of the electric conductors.

In a preferred embodiment of the subject of the invention the somewhat broader strip consists of cardboard covered on both sides with plastic material, which after the fixing of the support is plastics-coated in such a manner that the sensor, the connecting contacts and at least the nearest part of the electric conductors are covered by means of a plastic layer which in a tight manner enwraps these parts to the somewhat broader strip.

If the device in accordance with the invention is intended for medical usage, it is suitably sterilized and packed in a sterile manner before being delivered to the ultimate user.

BRIEF DESCRIPTION OF DRAWINGS

FIG. 1 shows a sensor intended for use in the manufacture of the device in accordance with the invention.

FIG. 2 shows a finished construction in accordance with the invention.

FIG. 3 finally shows a sheet prepared for the manufacture of devices in accordance with the invention.

BEST MODE OF CARRYING OUT THE INVENTION

A preferred embodiment of the subject of the invention is shown in FIG. 2. It consists of a sensor 1, which in the example shown is constituted of a thermistor. This thermistor is made up of an inner ceramic material 2, whose electric resistance varies with the temperature. The thermistor is shown in untrimmed condition in FIG. 1. On its underside the thermistor is provided with two contacts 3 and 4 which, for example, may consist of a thin layer of silver. Similarly, the thermistor is provided on its upper side with a silver contact 5 intended for trimming. The trimming may take place so that a small area 6 of the contact 5 is removed by mechanical treatment, e.g. shot peening or with the help of a laser beam. The thermistor is arranged on a support 7 which consists of an inner plastic material 8 with outer metal coatings 9 and 10. These metal coatings may, for example, consist of copper. At its front end, that is to say, the end provided with the sensor 1, the carrier 7 is short-circuited by a soldering 11 in such a manner that the metal coating 9 is in contact with a part 10' of the upper layer 10. This part 10' of the upper metal coating 10 is separated from the rest of this metal coating by a cut 12 which is meant electrically to isolate the two contacts 3 and 4 from one another.

The support 7 with the thermistor 1 described above is placed in turn on a somewhat broader strip 13. This strip 13 may consist of an inner cardboard material 14 with outer plastic coatings 15 and 16. The support 7 is placed so that the thermistor 1 is located fully within the surface 17 of the somewhat broader strip 13 carrying the support 7. The opposite end of the support, on the other hand, is arranged so that it projects beyond the somewhat broader strip 13. The idea behind this is that the part of the whole construction shown to the right in FIG. 2 should be capable of being dipped into an insulating plastic coating, so that the thermistor 1, connecting contacts 3,4 and 5 and at least the nearest part of the electric conductors 9 and 10 are enwrapped in a tight manner to the corresponding end of the somewhat broader strip 13. This plastic wrapping can be made relatively thin by means of a transparent material and is therefore not shown in FIG. 2. The sterile package into which it is intended finally to pack the construction is also not shown.

In FIG. 3 finally a plastic sheet is shown which has been prepared for the manufacture of devices similar to that according to FIG. 2. This plastic sheet consists therefore of an inner plastic layer 8a with outer metal coatings 9a and 10a, the upper metal coating 10a being divided by a cut 12a to form a detached part 10a'. This detached part 10a' is short-circuited with the layer 9a in that the latter is folded around the edge of the sheetlike starting material. Thus the construction differs here from the construction shown in FIG. 2, where instead of the folded over part 11a a soldering 11 is applied. The broken lines 18a indicate how the sheet 7a is to be divided up before or after the placing of thermistors 1 in the manner as shown in detail in FIG. 2.

Alternatively, the part 10a' could be eliminated in the construction according to FIG. 3 in such a way that the gap 12a is formed directly between the coating 10a and the folded over part 11a. No such embodiment has been shown in the drawings, however, since it represents an alternative which is evident to those versed in the art.

Naturally, the invention is not limited merely to the embodiments described above, but, it can be varied within the scope of the following claims. Moreover, as mentioned earlier, its application is not limited merely to the medical field.

The reading of the measured values can take place in various ways, e.g. as described in the aforementioned patent applications. It is done preferably, however, with the help of tongs of the type as shown in the patent application PCT/SE78/0013, now U.S. Pat. No. 4,253,334, . . . submitted at the same time, reference to the relevant parts of which is made in this matter.

As an alternative to the thermistor 1 a thermocouple may be used, the electromotive force of which varies with the temperature.

We claim:

1. A method of manufacturing temperature measurement devices, comprising the steps of:
   providing a sheet of electric insulating material;
   providing one side of said sheet with electric conducting material to form a first electric conductor;
   providing an opposite side of said sheet with electric conducting material to form a second electric conductor;
   electrically short-circuiting said first and second electric conductors along one edge of said sheet;
   removing a portion of one of said first and second electric conductors to form a gap therein extending generally parallel to said one edge of said sheet;
   cutting said sheet along at least one line generally perpendicular to said gap and hence said one edge of said sheet to form a plurality of individual strips from said sheet;
   providing each strip with its own temperature-sensitive sensor having a pair of electric contacts such that one contact is electrically connected to said first electric conductor of said strip and the other contact is electrically connected to said second electric conductor of said strip, thereby forming a plurality of temperature measurement devices.

2. A method according to claim 1, wherein said first and second electric conductors are short circuited by soldering said conductors to each other along said one edge of said sheet.

3. A method according to claim 1, wherein said first and second electric conductors are short circuited by folding one of said first and second electric conductors around said one edge of said sheet such that said first and second electric conductors are electrically connected to each other.

4. A method according to claim 1, wherein said gap is formed by planing.

5. A method according to claim 3, wherein said gap is formed by scraping.

6. A method of manufacturing temperature measurement devices, comprising the steps of:
   providing a sheet of electric insulating material;
   providing a portion of one side of said sheet with electric conducting material to form a first electric conductor;
   providing an opposite side of said sheet with electric conducting material to form a second electric conductor;
   folding said second electric conductor around one edge of said sheet such that said second electric conductor is applied to said one side of said sheet in spaced-apart relationship to said first electric conductor so as to form a gap between said conductors generally parallel to said one edge of said sheet;

cutting said sheet along at least one line generally perpendicular to said gap and hence said one edge of said sheet to form a plurality of individual strips from said sheet;

providing each strip with its own temperature-sensitive sensor having a pair of electric contacts such that one contact is electrically connected to said first electric conductor of said strip and the other contact is electrically connected to said second electric conductor of said strip, thereby forming a plurality of temperature measurement devices.

7. A method of making a temperature-sensitive instrument, comprising the steps of:

applying a first electric conductor to one surface of an elongated support member;

applying a second electric conductor to an opposite surface of said support member, said second electric conductor being connected electrically to said first electric conductor around one end of said support member; cutting out a portion from one of said first and second conductors adjacent said one end of said support member to form a gap; and bridging said gap with a temperature-sensitive sensor, having first and second electric contacts, such that said first contact is connected to said first electric conductor and said second contact is connected to said second electric conductor.

8. A method in accordance with claim 7, wherein said second electric conductor extends around said one end of said support member and contacts said first electric conductor.

9. A method in accordance with claim 7, further including the step of supporting said support member with another support member, which is formed of semi-rigid material, such that said sensor is located entirely within the borders of said another support member.

10. A method of making a temperature-sensitive instrument, comprising the steps of:

applying a first electric conductor to one surface of an elongated support member, said first electric conductor being shorter than said support member;

applying a second electric conductor to an opposite surface of said support member, said second electric conductor extending around one end of said support member to said one surface thereof and terminating at a point spaced from said first conductor to form a gap on said support member without overlapping said first electric conductor; and bridging said gap with a temperature-sensitive sensor, having first and second electric contacts, such that said first contact is connected to said first electric conductor and said second contact is connected to said second electric conductor.

11. A method in accordance with claim 10, further including the step of supporting said support member with another support member, which is formed of semi-rigid material, such that said sensor is located entirely within the borders of said another support member.

* * * * *

UNITED STATES PATENT AND TRADEMARK OFFICE
CERTIFICATE OF CORRECTION

PATENT NO. : 4,349,958
DATED : September 21, 1982
INVENTOR(S) : Hakansson et al.

It is certified that error appears in the above-identified patent and that said Letters Patent are hereby corrected as shown below:

Column 4, line 54, "claim 3" should read --claim 1--.

Signed and Sealed this

Twenty-eighth Day of December 1982

[SEAL]

Attest:

GERALD J. MOSSINGHOFF

Attesting Officer

Commissioner of Patents and Trademarks